(No Model.)
C. A. KRUTSCH.
DEVICE FOR OPERATING JAIL CELL DOORS.
No. 527,752.  Patented Oct. 16, 1894.
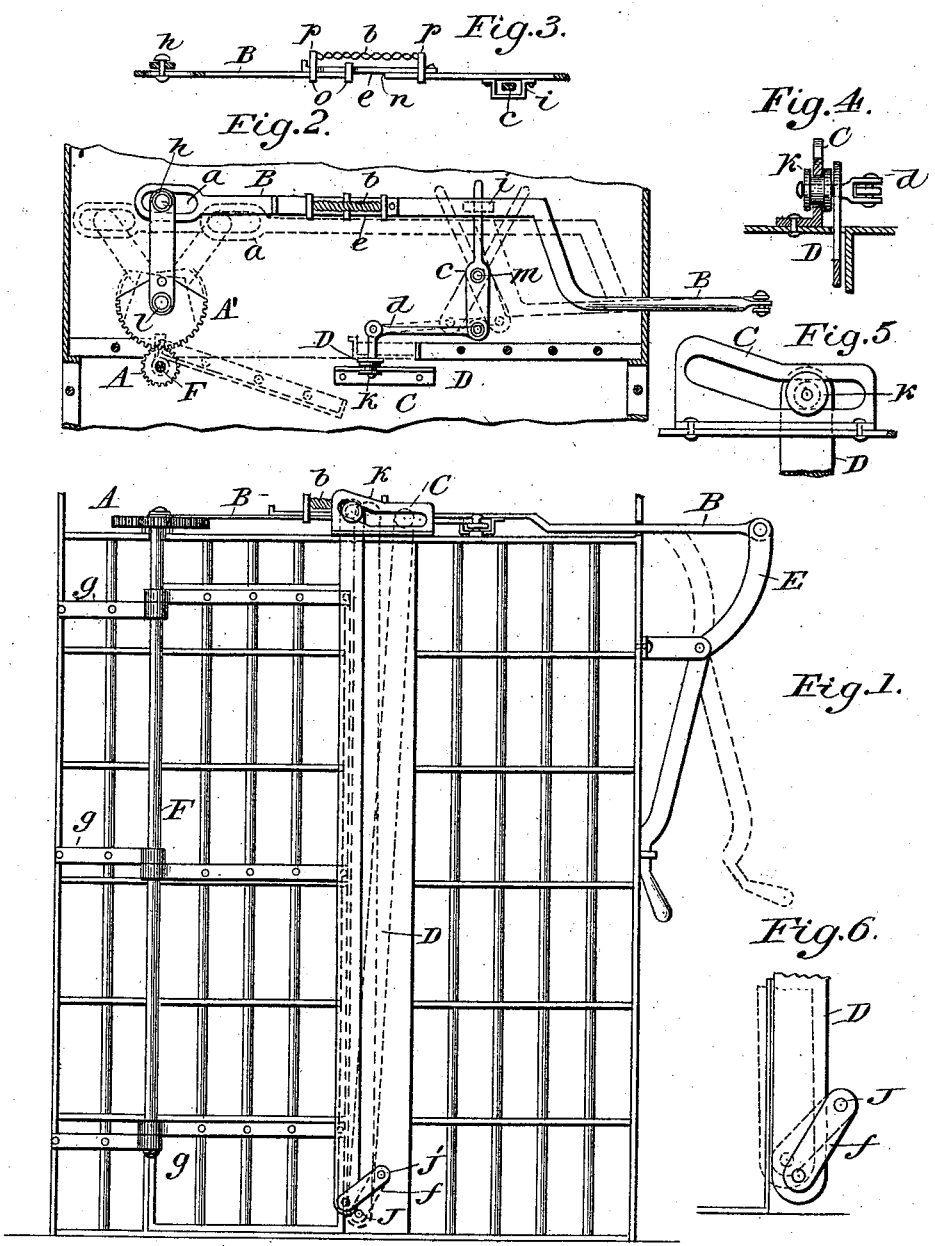
Witnesses:
John Gray
Jos. Laycock
Inventor.
Chas. A. Krutsch.

UNITED STATES PATENT OFFICE.

CHARLES AMMON KRUTSCH, OF LOGANSPORT, INDIANA.

DEVICE FOR OPERATING JAIL-CELL DOORS.

SPECIFICATION forming part of Letters Patent No. 527,752, dated October 16, 1894.

Application filed November 24, 1893. Serial No. 491,912. (No model.)

*To all whom it may concern:*

Be it known that I, CHARLES AMMON KRUTSCH, of Logansport, in the county of Cass and State of Indiana, have invented certain new and useful Improvements in Devices for Opening, Closing, Locking, Unlocking, and Securing Jail-Cell Doors; and I do hereby declare the following to be a full, clear, and exact description of the invention, such as will enable others skilled in the art to which it pertains to make and use it, reference being made to the accompanying drawings, which form part of this specification.

My invention has reference to devices for opening, closing, locking, unlocking and securing jail cell doors; and it consists in the novel features of construction which will be fully described hereinafter, and more particularly referred to in the claims.

The object of my invention is to construct a device for opening, closing, locking, unlocking and securing jail cell doors from the jailer's outer corridor, so that it will be unnecessary for the jailer to go into the prisoners' corridor, or come in contact with the prisoners, for the purpose of opening, closing, locking, unlocking and securing the jail cell doors.

Referring to the accompanying drawings,—Figure 1, is a front view of cell and cell door showing the device placed in position. The full lines with link $f$ show the securer or locking device D over the edge of the door and therefore locked. The dotted lines to the right show the full travel of it when the door is required to be opened. Fig. 2, is a top view of cell as it appears after the removal of the covering above; Fig. 3, a front view of shifting bar B; Fig. 4, an enlarged sectional view of inclined plane C and securer D; Fig. 5, an enlarged front view of inclined plane C and securer D; Fig. 6, an enlarged section of securer D and link $f$.

Similar letters refer to similar parts throughout the several views.

F represents the shaft on which are secured the hinges $g$ of the cell doors.

A. A' are gear wheels, one being made secure to shaft F the other hung on a pivot $l$, lever $h$ being attached to A' and the outer end of $h$ being attached through the oblong slot $a$ of shifting bar B. On the under or upper side of shifting bar B is formed a slot $i$ through which works lever $c$ which works on a pivot $m$. At the opposite end of $c$ is attached shifting rod $d$. Shifting rod $d$ is attached through the incline plane C to securer D. The lower end of securer D is connected with the link $f$ by the pivot J. The link $f$ is also secured to the front of the cell by the pivot J'. Shifting bar B is in two pieces at $n$ and the connection is made by the bar $e$ which is turned up at one end to prevent it passing slots $o$—$o$ which are formed on the piece of bar B, at the left. The other end of bar $e$ is made fast to the opposite end of bar B thus making one continuous bar of B. $e$ working in slots $o$—$o$ allows B to stretch.

$b$ is a spring placed either above or below on shifting bar B at $n$ attached to each piece of B at $p$—$p$. This spring is placed there to allow shifting bar B to stretch and to draw both ends of B together again. Oblong slot $a$ on end of shifting bar B is required to allow the door to swing back. After the door is thrown open by the lever, the door can be further pushed back against the wall of cell by hand (the lever will not throw it against wall). This is allowed through the assistance of lost motion slot "$a$" also to remove the locking device or securer D from the edge of the door before door is ready to open.

$k$ is a grooved wheel attached to the locking device or securer D and works in the inclined plane C.

Shifting bar B is attached to lever E in the jailer's corridor.

The object of the inclined plane C will be apparent by referring to Figs. 1, 5 and 6. The locking device or securer is hung at the bottom with link $f$ with pivots J—J'. By the shifting of securer D at the top through the inclined plane C throws the locking device or securer D full length over the edge of the door.

In operation by pulling the lever E to which is attached the shifting bar B as shown in solid lines to the position shown in dotted lines, the locking device or securer D will be thrown off the door, after which the door will be opened by shaft F on hinges $g$ without further pulling of the lever. To close the door, you push lever E to position as shown in solid lines, which closes the door, and it is adjusted so that there is sufficient stretch in the spring $b$, on bar B to force the locking device or securer D over the full edge of the door after the door is closed which forms the lock. The lever E is locked to side of cell in jailer's corridor, which will keep the securer D in position and the cell door locked until the lever E is unlocked in the jailer's corridor.

Having thus described my invention, I claim—

1. In a jail door operating device, the shifting bar having spring connected sections, and a slotted connection with the gear for operating the door in combination with an operating lever, and connection from said bar to door locking mechanism, all substantially as shown and described.

2. The combination with the sectional spring connected bar B, the door operating gear actuated thereby, and connections from said bar to the pivoted securing bar D, of said bar D, and a lever for operating said parts, all substantially as shown and described.

3. In jail door devices, the combination of the sectional spring connected bar, having the slot at one end, the gears and lever the latter operating in said slot, a vibrating locking bar supported at its lower end by a link, and at its upper end being controlled by a cam slot, and lever connections from said sectional bar for actuating the locking bar, and means for actuating said sectional bar, all substantially as shown and described.

4. In a jail door operating device, the sectional spring bar consisting of the two parts secured together by the spring $b$, one end of one member of the bar being slotted and having guides $o, o$, the other member having a part $e$, working through said guides, in combination with gearing for opening and closing the doors, and lever connections from said sectional bar to the door securing bar, all substantially as shown and described.

5. The lever $c$ in combination with shifting bar B, bar $d$, inclined plane C, and grooved wheel $k$, connected with shifting bar D, substantially as shown and for the purposes described.

6. The link $f$ in connection with shifting bar D, with the grooved wheel $k$ and the inclined plane C, for the purpose of throwing the bar D over the full edge of the door and thus forming the lock, substantially as shown and for the purposes set forth.

In testimony whereof I affix my signature in presence of two witnesses.

CHARLES AMMON KRUTSCH.

Witnesses:
JOS. LAYCOCK,
GEORGE S. KISTLER.